(12) United States Patent
Suk et al.

(10) Patent No.: US 8,909,688 B2
(45) Date of Patent: Dec. 9, 2014

(54) METHOD OF SEEKING SEMIANALYTICAL SOLUTIONS TO MULTISPECIES TRANSPORT EQUATIONS COUPLED WITH SEQUENTIAL FIRST-ORDER REACTIONS

(71) Applicant: Korea Institute of Geoscience and Mineral Resources, Daejeon (KR)

(72) Inventors: Heejun Suk, Daejeon (KR); Kyoochul Ha, Daejeon (KR)

(73) Assignee: Korea Institute of Geoscience and Minerals Resources, Daejeon (KR)

(*) Notice: Subject to any disclaimer, the term of this patent is extended or adjusted under 35 U.S.C. 154(b) by 0 days.

(21) Appl. No.: 13/941,926

(22) Filed: Jul. 15, 2013

(65) Prior Publication Data

US 2014/0136586 A1    May 15, 2014

(30) Foreign Application Priority Data

Nov. 13, 2012  (KR) .................. 10-2012-0128160

(51) Int. Cl.
*G06F 7/38* (2006.01)
*G06F 17/14* (2006.01)
*G06F 17/10* (2006.01)
*G06F 7/60* (2006.01)
*G06G 7/50* (2006.01)
*G06F 17/13* (2006.01)

(52) U.S. Cl.
CPC ...................................... *G06F 17/13* (2013.01)
USPC .................... 708/446; 708/400; 703/2; 703/9

(58) Field of Classification Search
USPC ......... 708/400–401, 446, 490; 703/2, 6, 9–10
See application file for complete search history.

(56) References Cited

PUBLICATIONS

Clement, T.P., "Generalized solution to multispecies transport equations coupled with a first-order reaction network," Water Resour. Res., vol. 37, No. 1, pp. 157-163, 2001.*
Sun, Y., Petersen, J.N., and Clement, T.P., "Development of analytical solutions for multiple-species transport with serial and parallel reactions," Water Resour. Res, vol. 35, No. 1, pp. 185-190, 1999.*
Quezada, C.R., Clement, T.P., Lee, K.K., "Generalized solution to multi-dimensional multi-species transport equations coupled with a first-order reaction network involving distinct retardation factors," Adv. Water Resour. 27, pp. 508-521, 2004.*

(Continued)

*Primary Examiner* — Chat Do
*Assistant Examiner* — Matthew Sandifer
(74) *Attorney, Agent, or Firm* — Maxon IP, LLC; Justin H. Kim (57) ABSTRACT

Disclosed is a method of seeking semianalytical solutions to multispecies transport equations coupled with sequential first-order network reactions under conditions wherein a groundwater flow velocity and a dispersion coefficient vary spatially and temporally and boundary conditions vary temporally. This invention provides a method of seeking semianalytical solutions to dechlorination equations coupled with sequential first-order reactions, wherein analytical solutions to complex problems such as inhomogeneous media and unsteady flow are derived by combining a similarity transformation method of Clement and a generalized integral-transform technique (GITT), and are verified through comparison with 2DFATMIC which is a commercial numerical program, and thereby can be utilized in nuclear waste sites contaminated with radioactive materials and decayed daughter nuclides and industrial complexes contaminated with chlorinated organic solvents such as PCE (tetrachloroethene), TCE (trichloroethene) and biodegradable byproducts thereof, and can also be widely used in verification of developed numerical programs.

5 Claims, 3 Drawing Sheets

(56) References Cited

PUBLICATIONS

Pérez Guerrero, J.S., Skaggs, T.H., van Genuchten, M.Th., "Analytical solution for multi-species contaminant transport in finite media with time-varying boundary condition," Transport Porous Med. 85, pp. 171-178, 2010.*

J.S. Chen, K.H. Lai, C.W. Liu, C.F. Ni, "A novel method for analytically solving multi-species advective-dispersive transport equations sequentially coupled with first-order decay reactions," Journal of Hydrology, 420-421, pp. 191-204, 2012.*

Heejun Suk, Byung-Gon Chae, "Analytical Solution of Multi-species Transport Equations Coupled with a First-order Reaction Network Under Various Boundary Conditions," Journal of Korean Society of Soil and Groundwater Environment, vol. 16, No. 6, pp. 46-57, 2011.*

Heejun Suk & Byung-Gon Chae, Analytical Solution of Multi-species Transport Equations Coupled with a First-order Reaction Network Under Various Boundary Conditions, Korea Institute of Geoscience and Mineral Resources, Underground Water Toil Environmental vol. 16(6), p. 46-57, 2011.

Korean Intellectual Property Office, Office Action of Korean Patent Application No. 10-2012-0128160 dated Jan. 26, 2013.

* cited by examiner

Figure 1

| Proponent | Considered contamination species | Use method |
|---|---|---|
| Cho(1971) | 3 contamination species (sequential first-order reaction) | Laplace Transformation |
| Van Genuchten (1985) | 4 contamination species (sequential first-order reaction) | Laplace Transformation |
| Lunn et al. (1996) | 3 contamination species (sequential first-order reaction) | Fourier sine Transform |
| Sun et al. (1999a) | several contamination species (sequential first-order reaction) | Laplace Transformation |
| Sun et al. (1999b) | several contamination species (Serial and parallel reaction network) | |
| Clement (2001) | several contamination species (Serial and parallel reaction network) | Linear Transformation Principle |

METHOD OF SEEKING SEMIANALYTICAL SOLUTIONS TO MULTISPECIES TRANSPORT EQUATIONS COUPLED WITH SEQUENTIAL FIRST-ORDER REACTIONS

CROSS-REFERENCES TO RELATED APPLICATIONS

This patent application claims the benefit of priority from Korean Patent Application No. 10-2012-0128160, filed on Nov. 13, 2012, the contents of which are incorporated herein by reference in its entirety.

BACKGROUND OF THE INVENTION

1. Field of the Invention

The present invention relates to a method of seeking analytical solutions, and, more particularly, to a method of seeking semianalytical solutions to multispecies transport equations coupled with sequential first-order network reactions under conditions in which a groundwater flow velocity and a dispersion coefficient vary spatially and temporally and boundary conditions vary temporally.

In addition, the present invention relates to a method of seeking analytical solutions to complex problems such as inhomogeneous media and unsteady flow by combining a similarity transformation method of Clement with a generalized integral-transform technique (GITT).

2. Description of the Related Art

Typically, analytical solutions have been efficiently used to estimate and analyze groundwater contaminant transport.

Also, such analytical solutions may be very efficiently used to verify developed numerical solutions.

Further, thorough research into analytical solutions has been conventionally carried out, and conventional studies on analytical solutions include, for example, those disclosed in Domenico, 1987; Bear, 1979; Domenico and Robbins, 1985; Chilakapati and Yabusaki, 1999; Manoranjan and Stauffer, 1996.

However, such analytical solutions are limited only to analyzing single species contaminant transport, and the use thereof is even further restricted by complicated site situations.

For example, as in nuclear waste sites contaminated with radioactive materials and decayed daughter nuclides, and sites contaminated with chlorinated organic solvents such as PCE, TCE and biodegradable byproducts thereof, actual site situations are mainly associated with multispecies contaminant transport.

Figure 1:
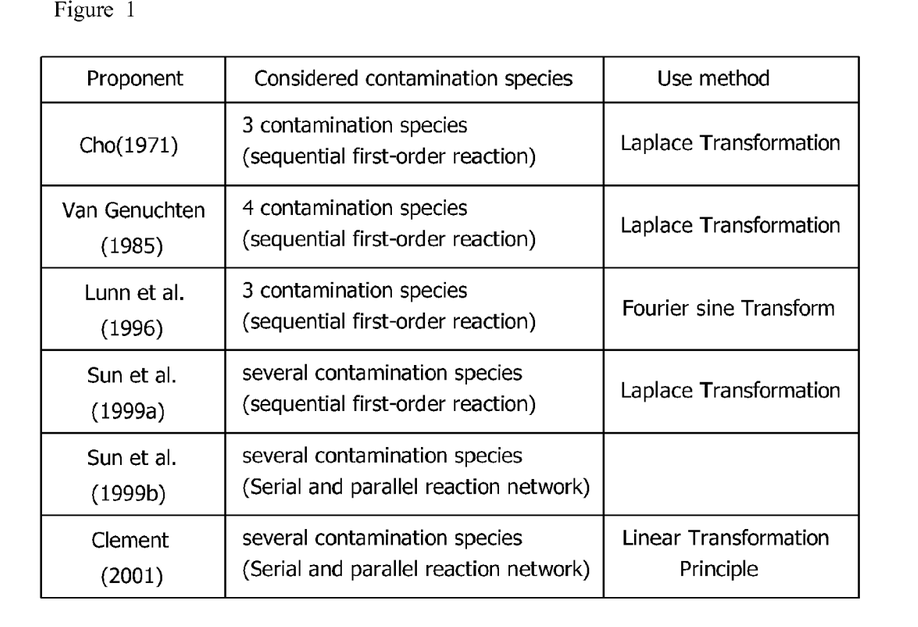
FIG. 1 illustrates a table in which conventional studies on analytical solutions are summarized.

With reference to FIG. 1, a table in which conventional studies on analytical solutions are summarized is illustrated.

As illustrated in FIG. 1, Cho (1971) and Lunn et al. (1996) developed analytical solutions to three chemical species under simple boundary conditions coupled with sequential first-order reactions, van Genuchten (1985) developed analytical solutions to four chemical species coupled with sequential first-order reactions, and Sun et al. (1999a) developed analytical solutions to an arbitrary number of chemical species coupled with sequential first-order reactions.

Also, Sun et al. (1999b)developed analytical solutions to problems having sequential or parallel reaction networks, and Clement (2001) disclosed a similarity transformation method for solving multispecies transport equations coupled with any type of reaction.

As mentioned above, intensive research into analytical solutions to multispecies transport equations has been carried out, but the aforementioned conventional methods may be mainly applied only to multispecies transport equations under conditions of steady flow, uniform velocity and dispersion coefficient, and are developed only under fixed concentration boundary conditions, and thus limitations are imposed on such methods.

Actually, porous media are not for the most part homogeneous, and the media vary spatially and temporally all the time.

Hence, in the analysis of such complicated contaminant transport, it is not easy to apply typical methods such as Laplace or Fourier transform to multispecies transport equations, and it is also not easy to apply them to single species transport equations.

In regard thereto, Liu et al. (2000) proposed a generalized integral-transform technique (GITT) to semi-analytically solve one-dimensional transport-dispersion equations of single species contaminants in inhomogeneous media having spatially and temporally varying groundwater flow and dispersion coefficients.

More specifically, Liu et al. (2000) determined analytical solutions on the assumption that groundwater flow velocity, dispersion coefficient, and decay rate are arbitrary functions with respect to time and space and also that initial conditions and boundary conditions are arbitrary functions with respect to time and space.

However, GITT provides no procedures for determining semianalytical and analytical solutions to multispecies transport equations coupled with sequential first-order reaction networks in the inhomogeneous media and unsteady flow.

Accordingly, with the goal of solving the conventional problems as above, although it is preferred that there is provided a method of seeking semianalytical solutions to multispecies transport equations coupled with sequential first-order network reactions under conditions in which a groundwater flow velocity and a dispersion coefficient vary spatially and temporally, initial conditions vary spatially, and boundary conditions vary temporally, methods which satisfy such requirements have not yet been introduced.

CITED REFERENCES

1. Bear, J., 1979, Hydraulics of Groundwater, McGraw-Hill, Inc., New York, pp. 268-269.
2. Chilakapati, A., Yabisaki, S., 1999, Nonlinear reactions and nonuniform flows, Water Resour. Res., 35(8), 2427-2438.
3. Cho, C. M., 1971, Convective transport of ammonium with nitrification in soil, Can. J. Soil Sci., 51, 339-350.
4. Clement, T. P., 2001, Generalized solution to multispecies transport equations coupled with a first-order reaction network, Water Resour. Res., 37(1), 157-163.
5. Domenico, P. A., 1987, An analytical model for multidimensional transport of a decaying contaminant species, J. Hydrol., 91, 49-58.
6. Domenico, P. A. and Robbins, G. A., 1985, A new method of contaminant plume analysis, Groundwater, 23, 476-485.
7. Liu, C., J. E. Szecsody, J. M. Zachara, and W. P. Ball, 2000, Use of the generalized integral transform method for solving equations of solute transport in porous media, Adv. Water Resour., 23(5), 483-492, doi:10.1016/S0309-1708(99)00048-2.
8. Lunn, M., Lunn, R. J., and Mackay, R., 1996, Determining analytic solution of multiple species contaminant transport, with sorption and decay, J. Hydrol., 180, 195-210.
9. Manoranjan, V., and Stauffer, T., 1996, Exact solution for contaminant transport with kinetic Langmuir sorption, Water Resour. Res., 32, 749-752.

10. Sun, Y., Petersen, J. N., Clement, T. P., 1999a, Analytical solution for multiple species reative transport in multiple dimensions, J. Com. Hydrol. 35(4), 429-440.

11. Sun, Y., Petersen, J. N., Clement, T. P., 1999b, Development of analytical solutions for multiple-species transport with serial and parallel reactions, Water Resour. Res, 35(1), 185-190.

12. van Genuchten, M. T., 1985, Convective-dispersive transport of solutes involved in sequential first-order decay reactions, Comput. Geosci., 11(2). 129-147.

13. Yeh, G-T, Cheng, J-R, Short, T. E., 1997, 2DFATMIC: User's manual of a two-dimensional subsurface flow, fate and transport of microbes and chemical model version 1.0, EPA/600/R-97/052, US EPA.

SUMMARY OF THE INVENTION

Accordingly, the present invention has been made keeping in mind the above problems encountered in the related art, and an object of the present invention is to provide a method of seeking semianalytical solutions to multispecies transport equations coupled with sequential first-order network reactions in which a groundwater flow velocity and a dispersion coefficient vary spatially and temporally and boundary conditions vary temporally, by solving conventional problems in which semianalytical and analytical solutions to multispecies transport equations coupled with sequential first-order reaction networks in inhomogeneous media and unsteady flow were not provided.

Another object of the present invention is to provide a method of seeking semianalytical solutions to multispecies transport equations coupled with sequential first-order network reactions in which a groundwater flow velocity and a dispersion coefficient vary spatially and temporally and boundary conditions vary temporally, by deriving analytical solutions to complex problems such as inhomogeneous media and unsteady flow by combining a similarity transformation method of Clement and GITT.

A further object of the present invention is to provide a method of seeking semianalytical solutions to dechlorination equations coupled with sequential first-order reactions, wherein the analytical solutions obtained as above are verified through comparison with 2DFATMIC which is a typical and commercial numerical program, and thereby may be utilized in nuclear waste sites contaminated with radioactive materials and decayed daughter nuclides and industrial complexes contaminated with chlorinated organic solvents such as PCE, TCE and biodegradable byproducts thereof, and may also be widely used in verification of developed numerical programs.

In order to accomplish the above objects, the present invention provides a method of seeking semianalytical solutions to multispecies transport equations, which is configured to execute, using an operating device comprising a computer or an exclusive hardware, a series of processes for seeking the semianalytical solutions to multispecies transport equations coupled with sequential first-order network reactions under conditions in which a groundwater flow velocity and a dispersion coefficient vary spatially and temporally and boundary conditions vary temporally, by combining a similarity transformation method of Clement with GITT, wherein the series of processes comprise transforming first-order linearly coupled multispecies transport equations into independent transport equations depending on contamination species through forward linear transformation; transforming governing equations of the independent transport equations depending on the contamination species transformed using the forward linear transformation; transforming initial conditions and boundary conditions for multiple contamination species into initial conditions and boundary conditions adapted for the independent transport equations depending on the contamination species, based on the forward linear transformation; determining analytical solutions depending on the contamination species transformed using the forward linear transformation under groundwater flow and dispersion coefficient varying with time and space, using GITT; and transforming the analytical solutions independently obtained depending on the contamination species into analytical solutions of the first-order linearly coupled multispecies transport equations through backward linear transformation, thereby determining analytical solutions for multispecies contaminant transport.

In the method according to the present invention, the transforming into the independent transport equations depending on the contamination species may be performed using the following equation:

$$a_i = C_i + \sum_{j=1}^{i-1} \prod_{i=j}^{i-1} \frac{y_{l+1}k_l}{k_l - k_i} C_j;$$

$$\forall\, i = 2, 3, \ldots, n$$

wherein $a_i$ is a concentration of the contamination species i transformed using the forward linear transformation, $C_i$ is a concentration of the contamination species i, $y_i$ is a production rate of the contamination species i, $k_i$ is a disappearance rate of the contamination species i, and $D(x, t)$ is the dispersion coefficient.

In the method according to the present invention, the transforming the governing equations may be performed using the following equation:

$$\frac{\partial a_i}{\partial t} + v(x, t)\frac{\partial a_i}{\partial x} - \frac{\partial}{\partial x}\left[D(x, t)\frac{\partial a_i}{\partial x}\right] = -k_i(x, t)a_i;$$

$$\forall\, i = 2, 3, \ldots, n.$$

wherein $a_i$ is a concentration of the contamination species i transformed using the forward linear transformation, $k_i$ is a disappearance rate of the contamination species i, $v(x, t)$ is the groundwater flow velocity, and $D(x, t)$ is the dispersion coefficient.

In the method according to the present invention, the determining the analytical solutions for multispecies contaminant transport may be performed using the following equation:

$$C_i = a_i - \sum_{j=1}^{i-1} \prod_{i=j}^{i-1} \frac{y_{i+1}k_i}{k_i - k_i} C_j;$$

$$\forall\, i = 2, 3, \ldots, n$$

wherein $a_i$ is a concentration of the contamination species i transformed using the forward linear transformation, $C_i$ is a concentration of the contamination species i, $y_i$ is a production rate of the contamination species i, $k_i$ is a disappearance rate of the contamination species i, and $D(x, t)$ is the dispersion coefficient.

In addition, the present invention provides a recording medium, in which a program configured to execute the above method on a computer is recorded.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Hereinafter, a detailed description will be given of a method of seeking semianalytical solutions to dechlorination equations coupled with sequential first-order reactions according to specific embodiments of the present invention, with reference to the appended drawings.

Herein, the following description is set forth to merely illustrate, but is not to be constructed as limiting, the present invention.

Specifically, the present invention pertains to a method of seeking semianalytical solutions to multispecies transport equations coupled with sequential first-order network reactions under conditions in which a groundwater flow velocity and a dispersion coefficient vary spatially and temporally and boundary conditions vary temporally, as will be described later.

More specifically, the present invention pertains to a method of seeking analytical solutions to complex problems such as inhomogeneous medium and unsteady flow, by combining a similarity transformation method of Clement with GITT, as will be described later.

Further, the present invention is directed to a method of seeking semianalytical solutions to dechlorination equations coupled with sequential first-order reactions, wherein analytical solutions may be verified through comparison with 2DFATMIC which is a typical and commercial numerical program, and thereby may be utilized in nuclear waste sites contaminated with radioactive materials and decayed daughter nuclides and industrial complexes contaminated with chlorinated organic solvents such as PCE (tetrachloroethene), TCE (trichloroethene)and biodegradable byproducts thereof, and may also be widely used in verification of developed numerical programs, as will be described later.

Referring to the appended drawings, the method of seeking semianalytical solutions to dechlorination equations coupled with sequential first-order reactions according to an embodiment of the present invention is specified below.

Figure 2:
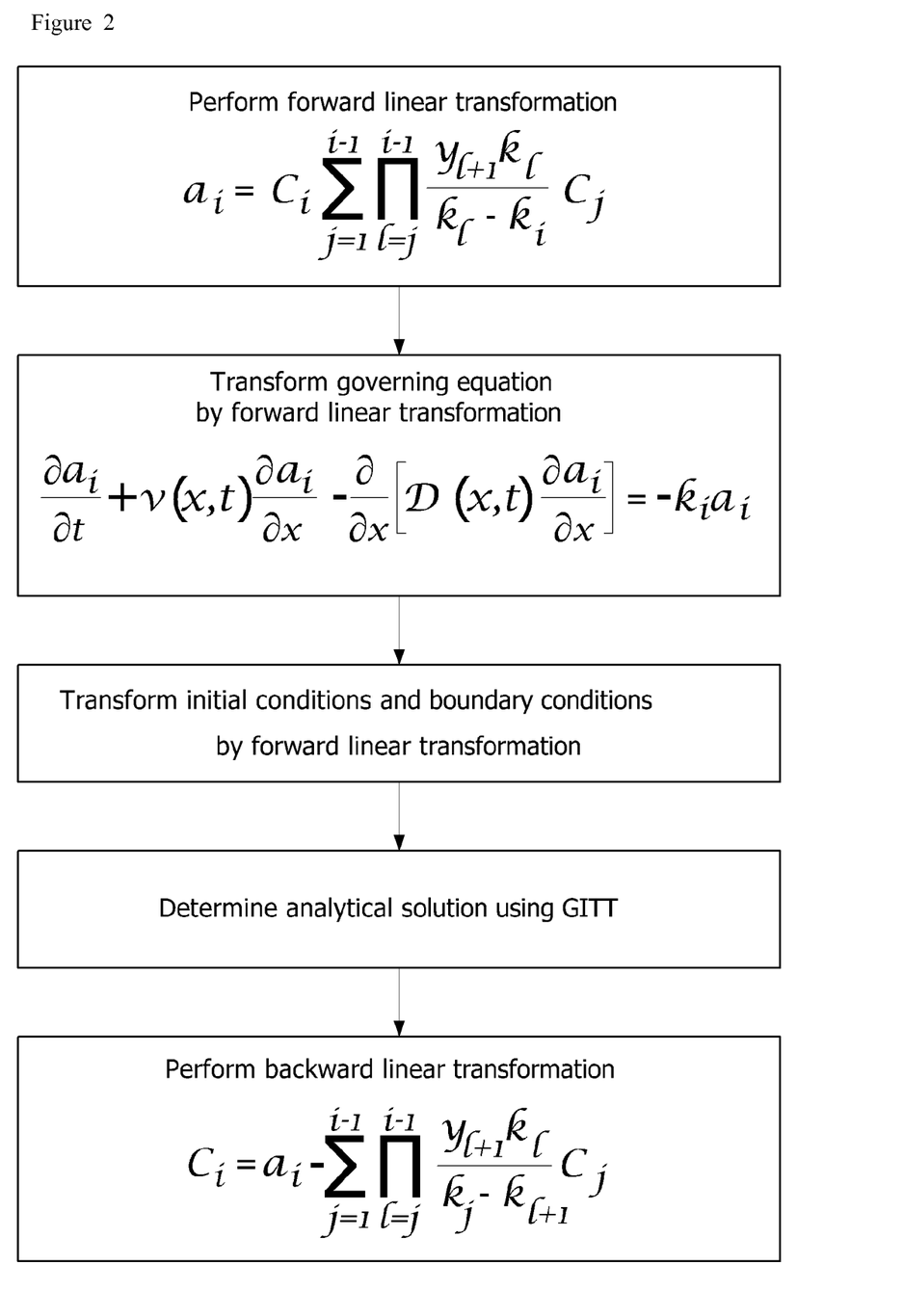
FIG. 2 illustrates a process of seeking analytical solutions by combining a similarity transformation method of Clement with GITT according to an embodiment of the present invention.

With reference to FIG. 2, the entire procedure for the method of seeking semianalytical solutions to dechlorination equations coupled with sequential first-order reactions according to an embodiment of the present invention is schematically illustrated.

The method of seeking semianalytical solutions to dechlorination equations coupled with sequential first-order reactions according to the embodiment of the present invention is characterized in terms of determining novel analytical solutions by combining a similarity transformation method of Clement with GITT. Particularly, the method according to the present invention is provided using a program for executing a series of processes on a computer or a recording medium in which such a program is recorded, or is provided using an exclusive hardware for executing the series of processes, wherein the series of processes include (1) transforming first-order linearly coupled multispecies transport equations into independent transport equations depending on contamination species through forward linear transformation; (2) transforming governing equations of the independent transport equations depending on the contamination species by the forward linear transformation; (3) transforming initial conditions and boundary conditions for multiple contamination species into initial conditions and boundary conditions adapted for the independent transport equations depending on the contamination species, based on the forward linear transformation; (4) determining analytical solutions depending on the contamination species transformed by the forward linear transformation under groundwater flow and dispersion coefficient varying with time and space, using GITT; and (5) transforming the analytical solutions independently calculated depending on the contamination species into analytical solutions of the first-order linearly coupled multispecies transport equations through backward linear transformation, thereby determining analytical solutions for multispecies contaminant transport.

As illustrated in FIG. 2, transforming into the transport equations is performed using the following equation.

$$a_i = C_i + \sum_{j=1}^{i-1} \prod_{l=j}^{i-1} \frac{y_{l+1} k_l}{k_l - k_i} C_j;$$

$$\forall\, i = 2, 3, \ldots, n$$

Also, as illustrated in FIG. 2, transforming the governing equations is performed using the following equation.

$$\frac{\partial a_i}{\partial t} + v(x, t)\frac{\partial a_i}{\partial x} - \frac{\partial}{\partial x}\left[D(x, t)\frac{\partial a_i}{\partial x}\right] = -k_i(x, t)a_i;$$

$$\forall\, i = 2, 3, \ldots, n.$$

Further, as illustrated in FIG. 2, determining the analytical solutions for multispecies contaminant transport is performed using the following equation.

$$C_i = a_i - \sum_{j=1}^{i-1} \prod_{l=j}^{i-1} \frac{y_{l+1} k_l}{k_l - k_i} C_j;$$

$$\forall\, i = 2, 3, \ldots, n$$

In FIG. 2, $a_i$ is the concentration of the contamination species i transformed by the forward linear transformation, $C_i$ is the concentration of the contamination species i, $y_i$ is the production rate of the contamination species i, $k_i$ is the disappearance rate of the contamination species i, $v(x, t)$ is the groundwater flow velocity, and $D(x, t)$ is the dispersion coefficient.

According to the embodiment of the present invention, the method of seeking the semianalytical solutions to dechlorination equations coupled with sequential first-order reactions is more specifically described below.

Typically, a one-dimensional mass-balance equation for estimating fate and transport of multispecies coupled with sequential first-order reactions may be represented by Equation 1 below.

$$\frac{\partial C_i}{\partial t} + v(x,t)\frac{\partial C_i}{\partial x} - \frac{\partial}{\partial x}\left[D(x,t)\frac{\partial C_i}{\partial x}\right] = \quad \text{[Equation 1]}$$
$$y_i k_{i-1}(x,t)C_{i-1} - k_i(x,t)C_i;$$
$$\forall i = 2, 3, \ldots, n$$
$$= -k_i(x,t)C_i;$$
$$i = 1$$
$$\forall t > 0$$
$$\text{and}$$
$$0 < x < \infty,$$

In Equation 1, $C_i$ is the concentration [ML$^{-3}$] of the species i; $y_i$ is the stoichiometric yield coefficient [MM$^{-1}$] for reaction of the species i−1 for producing the species i; $k_i(x,t)$ is the first-order decay rate constant [T$^{-1}$] of the species i; $v(x,t)$ is the velocity [LT$^{-1}$]; $D(x,t)$ is the dispersion coefficient [L$^2$ T$^{-1}$]; and n is the total number of species.

Also, $v(x,t)$, $D(x,t)$ and $k_i(x,t)$ are regarded as the functions of space x and time t.

The initial and boundary conditions of Equation 1 are represented by Equation 2 below.

$$v(x,t)C_i(x,t) - D(x,t)\frac{\partial C_i(x,t)}{\partial x}\bigg|_{x=0} = v(x=0,t)f_i(t); \quad \text{[Equation 2]}$$
$$\forall i = 1, 2, 3, \ldots, n$$

$$\frac{\partial C_i(x,t)}{\partial x}\bigg|_{x=L} = 0; \quad \text{[Equation 3]}$$
$$\forall i = 1, 2, 3, \ldots, n$$

$$C_i(x,t)|_{t=0} = F_i(x); \quad \text{[Equation 4]}$$
$$\forall i = 1, 2, 3, \ldots, n$$

In the above equations, L is the length [L] of a porous medium; $f_i(t)$ is the inlet concentration [ML$^{-3}$] of the species i at a flux boundary; and $F_i(x)$ is the initial concentration [ML$^{-3}$] of the species i.

Also, the combination of terms is associated with only the parent concentration thereof.

To analytically solve Equation 1, Sun et al. (1999b) and Clement (2001) proposed a method of transforming the coupled equations into a set of independent equations.

To transform the coupled equations into the set of independent equations, auxiliary variables are defined as in the following Equation 5.

$$a_i = C_i + \sum_{j=1}^{i-1} \prod_{l=j}^{i-1} \frac{y_{l+1}k_l}{k_l - k_i} C_j; \quad \text{[Equation 5]}$$
$$\forall i = 2, 3, \ldots, n$$

In Equation 5, i is the generated chain reaction number. If Equation 5 is differentiated with respect to time and used instead of Equation 1, the following Equation 6 having the above auxiliary variables as the main variables is obtained.

$$\frac{\partial a_i}{\partial t} + v(x,t)\frac{\partial a_i}{\partial x} - \frac{\partial}{\partial x}\left[D(x,t)\frac{\partial a_i}{\partial x}\right] = -k_i(x,t)a_i; \quad \text{[Equation 6]}$$
$$\forall i = 2, 3, \ldots, n.$$

In Equation 6, there are no coupled terms between the species, and thus the governing equations corresponding to any species are independent of equations corresponding to other species in the transformed zone.

The initial and boundary conditions may be transformed as represented in the following Equations 7 and 8.

$$a_{i0} = C_{i0} + \sum_{j=1}^{i-1} \prod_{l=j}^{i-1} \frac{y_{l+1}k_l}{k_l - k_i} C_{j0}; \quad \text{[Equation 7]}$$
$$\forall i = 2, 3, \ldots, n$$

$$a_{ib}(t) = C_{ib}(t) + \sum_{j=1}^{i-1} \prod_{l=j}^{i-1} \frac{y_{l+1}k_l}{k_l - k_i} C_{jb}(t); \quad \text{[Equation 8]}$$
$$\forall i = 2, 3, \ldots, n$$

In the above equations, $C_{i0}$ and $C_{ib}(t)$ are the initial and Dirichlet boundary conditions [ML$^{-3}$] of the species i in the non-transformed zone, and $a_{i0}$ and $a_{ib}(t)$ are the initial and boundary conditions [ML$^{-3}$] of the species i in the transformed zone.

In the case where flux-type boundary conditions are related, flux boundary conditions are transformed as represented in the following Equation 9.

$$J_{ai}(t) = J_{ci}(t) + \sum_{j=1}^{i-1} \prod_{l=j}^{i-1} \frac{y_{l+1}k_l}{k_l - k_i} J_{cj}(t); \quad \text{[Equation 9]}$$
$$\forall i = 2, 3, \ldots, n$$

In Equation 9, $J_{ci}(t)$ is the value under the flux boundary conditions of the species i in the non-transformed zone ($J_{ci}(t) = v(x=0,t)f_i(t)$).

The semianalytical solutions to single species transport problems having first-order reactions under the initial conditions in Equation 7 and the boundary conditions in Equations 8 and 9 may be obtained by GITT.

Finally, in order to obtain the solutions of the concentrations of all the species in the non-transformed zone, continuous substitution treatment is performed as represented in the following Equation 10.

$$C_i = a_i - \sum_{j=1}^{i-1} \prod_{l=j}^{i-1} \frac{y_{l+1}k_l}{k_l - k_i} C_j; \quad \text{[Equation 10]}$$
$$\forall i = 2, 3, \ldots, n$$

In Equation 10, $a_i$ is the semianalytical solution of independent single species transport equation obtained by GITT.

Below is a specific description of GITT.

Equation 6 is related to the one-dimensional single species transport problems in which the flow, dispersion coefficient and decay rate vary temporally or spatially.

The variable substitution method in which Equation 9 is made homogeneous is represented in the following Equation 11.

$$a_i(x,t) = U_i(x,t) + g_i(t); \forall i = 2, 3, \ldots, n \quad \text{[Equation 11]}$$

In Equation 11, $$g_i(t) = f_i(t) + \sum_{j=1}^{i-1} \prod_{l=j}^{i-1} \frac{y_{l+1} k_l}{k_l - k_i} f_j(t)$$

and $f_j(t)$ and $U_i(x, t)$ are the solutions of the following Equation 12.

$$\frac{\partial U_i}{\partial t} + \frac{dg_i(t)}{dt} + v(x, t)\frac{\partial U_i}{\partial x} - \frac{\partial}{\partial x}\left[D(x, t)\frac{\partial U_i}{\partial x}\right] = -k_i(x, t) a_i \quad \text{[Equation 12]}$$

As such, $U_i(x, t)$ has the boundary conditions as in the following Equations 13 and 14.

$$v(x, t) U_i(x, t) - D(x, t)\frac{\partial U_i(x, t)}{\partial x}\bigg|_{x=0} = 0 \quad \text{[Equation 13]}$$

$$\frac{\partial U_i(x, t)}{\partial x}\bigg|_{x=L} = 0 \quad \text{[Equation 14]}$$

To solve Equation 12 having the boundary conditions as in Equations 13 and 14, GITT showed a pair of transforms including integral transform and inverse transform (Almeida and Cotta, 1995; Cotta, 1993; Liu et al., 2000).

In GITT, to construct the pair of transforms, the auxiliary problems shown in the following Equation 15 are selected.

$$\frac{d^2 \varphi_n(x)}{dx^2} + \beta_n^2 \varphi_n(x) = 0, \quad \text{[Equation 15]}$$
$$n = 1, 2, \ldots, \infty$$

As such, the boundary conditions are as follows.

$$v_0 \varphi_n(x) - D_0 \frac{d\varphi_n(x)}{dx}\bigg|_{x=0} = 0 \quad \text{[Equation 16]}$$

$$\frac{d\varphi_n(x)}{dx}\bigg|_{x=L} = 0 \quad \text{[Equation 17]}$$

In the above equations, $\beta_n$ and $\Phi_n(x)$ are the $n^{th}$ eigenvalue and the eigenfunction corresponding thereto, and $v_0$ and $D_0$ are $v(x, t)$ and $D(x, t)$ at $x=0$ and $t=0$.

Equation 15 having the boundary conditions as in Equations 16 and 17 has the following eigenfunction and norm.

$$\varphi_n(x) = \cos(\beta_n(L - x)), \quad \text{[Equation 18]}$$
$$N_n = \frac{1}{2}\left(L + \frac{v_0 D_0}{\beta_n^2 D_0^2 + v_0^2}\right)$$

As shown in the following Equation 19 using the eigenfunction, a forward transform may be performed, and as shown in the following Equation 20, an inverse transform corresponding thereto may be performed.

$$T_n^i(t) = \frac{1}{N_n^{1/2}} \int_0^L \varphi_n(x) U_i(x, t) dx \quad \text{[Equation 19]}$$

$$U_i(x, t) = \sum_{n=1}^{M} \frac{1}{N_n^{1/2}} \varphi_n(x) T_n^i(t) \quad \text{[Equation 20]}$$

To derive $T_n^i(t)$ (n=1, 2, ..., M), the operator $$\int_0^L \varphi_n(x) dx \Big/ N_n^{1/2} \text{ is}$$

substituted into Equation 12, and an inverse transform is then performed, thus obtaining the following equations.

$$\sum_{r=1}^{M} A_{nr} \frac{dT_r^i(t)}{dt} + \sum_{r=1}^{M} B_{nr}(t) T_r^i(t) = g_n^i(T^i, t); \quad \text{[Equation 21]}$$
$$n = 1, 2, \ldots, M$$

$$A_{nr} = \int_0^L \frac{\varphi_n(x)\varphi_r(x)}{N_n^{1/2} N_r^{1/2}} dx \quad \text{[Equation 22a]}$$

$$B_{nr}(t) = \frac{1}{N_n^{1/2} N_r^{1/2}} \int_0^L \left\{ \begin{array}{l} v(x, t)\varphi_n(x)\dfrac{d\varphi_r(x)}{dx} - \\ \varphi_r(x)\dfrac{d}{dx}\left[D(x, t)\dfrac{d\varphi_n(x)}{dx}\right] \end{array} \right\} dx + \\ \frac{1}{N_n^{1/2} N_r^{1/2}} \left[ \begin{array}{l} v(x=0, t)\varphi_n(0)\varphi_r(0) - \\ D(x=0, t)\varphi_r(0)\dfrac{d\varphi_n(0)}{dx} \end{array} \right] \quad \text{[Equation 22b]}$$

$$g_n^i(T^i, t) = \int_0^L \frac{\varphi_n(x)}{N_n^{1/2}}\left(-k_i a_i - \frac{dg_i(t)}{dt}\right) dx \quad \text{[Equation 23]}$$

Also, the initial conditions for Equation 21 may be derived as follows.

$$T_n^i(0) = \int_0^L \frac{\varphi_n(x)}{N_n^{1/2}} [G_i(x) - g_i(0)] dx \quad \text{[Equation 24]}$$

$$G_i(x) = F_i(x) + \sum_{j=1}^{i-1} \prod_{l=j}^{i-1} \frac{y_{l+1} k_l}{k_l - k_i} F_j(x) \quad \text{[Equation 25]}$$

As mentioned above, when the set of coupled first-order difference equations for $T_r^i(t)$ is solved, the inverse transform equation as shown in Equation 20 may be used to calculate $U_i(x, t)$, and Equation 11 may also be used to calculate the concentration $a_i(x, t)$.

Finally, the substitution procedure shown in Equation 10 is applied to obtain $C_i(x, y)$.

Typically, although Equation 21 having the initial conditions as in Equation 24 is numerically solved, it may be semi-analytically solved in the cases where there are, first, solute transport problems in homogeneous porous media under normal flow, and, second, transient flow and first-order decay reactions in homogeneous porous media.

In the former case, on the assumption that the decay rate and the dispersion coefficient of any space variable function are in a steady state, Equations 21, 22 and 23 may be represented as follows.

$$\sum_{r=1}^{M} A_{nr} \frac{dT_r^i(t)}{dt} + \sum_{r=1}^{M} B_{nr}(t) T_r^i(t) = g_n^i(t);$$ [Equation 26]

$$n = 1, 2, \ldots, M$$

$$A_{nr} = \int_0^L \frac{\varphi_n(x)\varphi_r(x)}{N_n^{1/2} N_r^{1/2}} dx$$ [Equation 27a]

$$B_{nr} = \frac{1}{N_n^{1/2} N_r^{1/2}}$$ [Equation 27b]

$$\int_0^L \left\{ v(x)\varphi_n(x) \frac{d\varphi_r(x)}{dx} + D(x) \frac{d\varphi_r(x)}{dx} \frac{d\varphi_n(x)}{dx} \right\} dx +$$

$$\frac{1}{N_n^{1/2} N_r^{1/2}} v(0) \varphi_n(0) \varphi_r(0) +$$

$$\frac{1}{N_n^{1/2} N_r^{1/2}} \int_0^L k_i(x) \varphi_n(x) \varphi_r(x) dx$$

$$g_n^i(t) = \int_0^L \frac{\varphi_n(x)}{N_n^{1/2}} \left( -k_i g_i(t) - \frac{dg_i(t)}{dt} \right) dx$$ [Equation 28]

In this case, the solutions may be derived as represented in the following Equation 29 based on linear system theory (Rugh, 1996).

$$T^i(t) = \exp(-A^{-1}Bt) T^i(0) +$$ [Equation 29]

$$\exp(-A^{-1}Bt) \times \int_0^t \exp(A^{-1}B\tau) A^{-1} G^i(\tau) d\tau$$

In the above equation, constant matrixes A and B and vector G may be analytically or numerically calculated depending on the function properties upon integration.

In the present embodiment, the numerical calculation of the constant matrix or vector is carried out using a fast Fourier transform to achieve efficiency and accuracy of integration (Press et al., 1992). Also, in order to efficiently and accurately evaluate the index matrix of Equation 29, an eigenvalue method is utilized (Moler and van Loan, 1978).

In the latter case, when the porous medium is homogeneous and the flow velocity, dispersion coefficient and decay rate are temporally variable, the matrix coefficient of Equation 21 is as follows.

$$A_{nr} = \delta_{nr}$$ [Equation 30]

$$B_{nn}(t) = v(t) \left[ \alpha_L \beta_n^2 + \frac{1 - \cos^2(\beta_n L)}{2N_n} \right] + k_i(t)$$ [Equation 31]

$$B_{nr}(t) = v(t) \frac{\left\{ \begin{array}{c} \beta_r^2 [1 - \cos(\beta_n L)\cos(\beta_r L)] - \\ \beta_n \beta_r \sin(\beta_n L)\sin(\beta_r L) \end{array} \right\}}{[N_n^{1/2} N_r^{1/2} (\beta_r^2 - \beta_n^2)]}, n \neq r$$ [Equation 32]

$$g_n^i(t) = \left[ -\frac{dg_i(t)}{dt} - k_i(t) g_i(t) \right] \frac{\sin(\beta_n L)}{\beta_n N_n^{1/2}}$$ [Equation 33]

In the above equations, $\alpha_L$ is the longitudinal dispersivity [L], and thus the following solutions are obtained.

$$T^i(t) = \exp\left(-\int_0^t k_i(\sigma) d\sigma\right) \times \exp\left(-B_1 \int_0^t v(\sigma) d\sigma\right) T^i(0) +$$ [Equation 34]

$$\int_0^t \exp\left(-\int_\tau^t k_i(\sigma) d\sigma\right) \times \exp\left(-B_1 \int_\tau^t v(\sigma) d\sigma\right) G^i(\tau) d\tau$$

$$B_{1nn} = \alpha_L \beta_n^2 + \frac{1 - \cos^2(\beta_n L)}{2N_n}$$ [Equation 35]

$$B_{1nr} = \frac{\beta_r^2 [1 - \cos(\beta_n L)\cos(\beta_r L)] - \beta_n \beta_r \sin(\beta_n L)\sin(\beta_r L)}{N_n^{1/2} N_r^{1/2} (\beta_r^2 - \beta_n^2)}, n \neq r$$ [Equation 36]

Thereby, the semianalytical solutions to dechlorination equations coupled with sequential first-order reactions under conditions in which the groundwater flow velocity and the dispersion coefficient vary spatially and temporally and the boundary conditions vary temporally may be determined.

To verify the analytical solutions determined as above, the present inventors compared the solutions determined by the method according to the embodiment of the present invention with the numerical solutions determined using 2DFATMIC which is a conventionally available commercial program.

Figure 3:
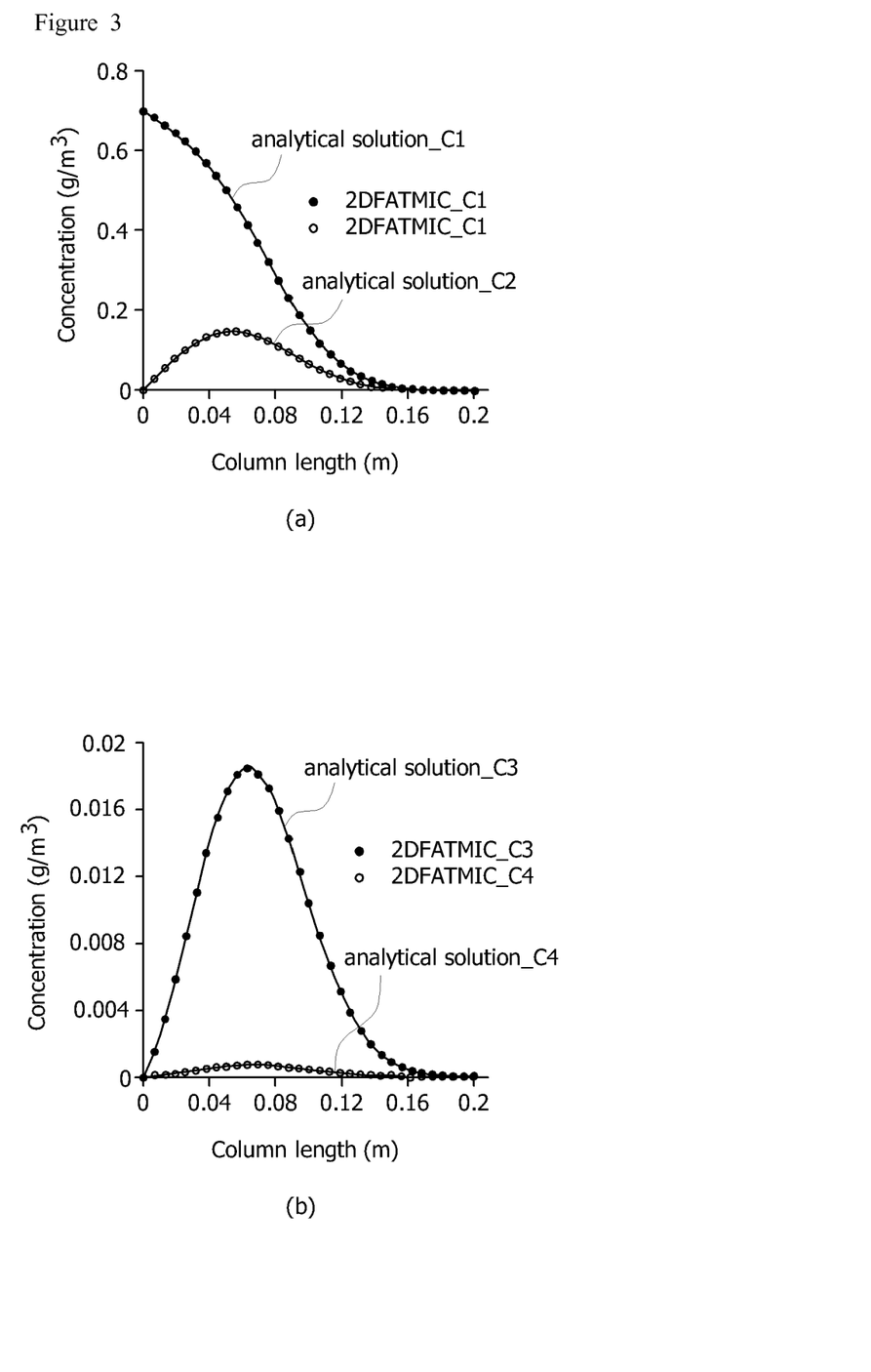
FIGS. 3A and 3B illustrate the results of comparison of analytical solutions determined using the process according to the present invention and numerical solutions determined using a conventional process, in order to verify analytical solutions determined using the process according to the embodiment of the present invention shown in FIG. 2.

With reference to FIGS. 3A and 3B, the analytical solutions determined using the method according to the embodiment of the present invention are verified by being compared with the actual cases, and this verification is described below.

FIGS. 3A and 3B illustrate the results of comparison of the analytical solutions determined using the method according to the present invention and the numerical solutions determined using a conventional method, in order to verify the analytical solutions determined by the method according to the embodiment of the present invention shown in FIG. 2.

Specifically, FIGS. 3A and 3B show the results of comparison of the analytical solutions determined using the method according to the present invention and the numerical solutions determined using 2DFATMIC which is a commercial program, under conditions in which the flow velocity and the dispersion coefficient vary with space and the boundary conditions vary with time.

For verification as shown in FIGS. 3A and 3B, the flow velocity and the dispersion coefficient depending on the space and the boundary conditions depending on the time are defined as follows.

$$v(x) = 0.09 \times \exp(-x) + 0.01$$ (1)

$$D(x) = 0.001 \times \exp(-x)$$ (2)

$$C_o(t) = [0.4 + 0.6 \times \exp(-t)]$$ (3)

$C_o(t)$ indicates the boundary concentration varying with time.

Further, as is apparent from FIGS. 3A and 3B, the analytical solutions obtained using the method according to the present invention can be seen to significantly coincide with the numerical solutions obtained using 2DFATMIC which is the conventional commercial program. The analytical solutions obtained using the method according to the present invention may provide the accurate results under the groundwater flow and the dispersion coefficient varying with time and space and the boundary conditions varying with time.

Through the above procedures, the method of seeking semianalytical solutions to dechlorination equations coupled with sequential first-order reactions according to the present invention may be achieved. Specifically, the algorithm of the method of seeking semianalytical solutions to dechlorination equations coupled with sequential first-order reactions according to the embodiment of the present invention is programmed and executed by a computer, etc., so that the semianalytical solutions to multispecies transport equations coupled with sequential first-order network reactions may be easily determined under conditions in which the groundwater flow velocity and the dispersion coefficient vary spatially and temporally and the boundary conditions vary temporally.

Also, the semianalytical solutions determined as above may be applied to nuclear waste sites contaminated with radioactive materials and decayed daughter nuclides and industrial complexes contaminated with chlorinated organic solvents such as PCE (tetrachloroethene), TCE (trichloroethene)and biodegradable byproducts thereof, and may also be widely used in verification of developed numerical programs.

As described herein before, the present invention can provide a method of seeking semianalytical solutions to multispecies transport equations coupled with sequential first-order network reactions in which a groundwater flow velocity and a dispersion coefficient vary spatially and temporally and boundary conditions vary temporally.

That is, the present invention can provide a method of seeking analytical solutions to complex problems such as inhomogeneous media and unsteady flow, by combining a similarity transformation method of Clement and GITT.

Furthermore, the present invention can provide a method of seeking semianalytical solutions to dechlorination equations coupled with sequential first-order reactions, wherein the analytical solutions can be verified through comparison with 2DFATMIC which is a typical and commercial numerical program, and thereby can be utilized in nuclear waste sites contaminated with radioactive materials and decayed daughter nuclides and industrial complexes contaminated with chlorinated organic solvents such as PCE (tetrachloroethene), TCE (trichloroethene)and biodegradable byproducts thereof, and can also be widely used in verification of developed numerical programs.

Although the method of seeking semianalytical solutions to dechlorination equations coupled with sequential first-order reactions according to the embodiments of the present invention is specified as above, the present invention is not limited only to the contents described in the above embodiments, and thus those having ordinary knowledge in the art to which the present invention belongs will appreciate that a variety of modifications, variations, additions and substitutions are possible depending on the needs for design and various other factors, without departing from the scope and spirit of the invention.

The invention claimed is:

1. A method of seeking semianalytical solutions to multispecies transport equations coupled with sequential first-order network reactions under conditions in which a groundwater flow velocity and a dispersion coefficient vary spatially and temporally and boundary conditions vary temporally, by combining a similarity transformation method of Clement with a generalized integral-transform technique (GITT), in order to determine groundwater multispecies contaminant transport in applications to nuclear waste sites contaminated with radioactive materials and decayed daughter nuclides, and sites contaminated with chlorinated organic solvents and biodegradable byproducts thereof, the method being carried out by a computer comprising a processor programmed to carry out the steps of the method, which comprise:

transforming, by the processor, first-order linearly coupled multispecies contaminant concentrations into independent concentrations depending on contamination species through forward linear transformation, using the following equation:

$$a_i = C_i + \sum_{j=1}^{i-1} \prod_{l=j}^{i-1} \frac{y_{l+1}k_l}{k_l - k_i} C_j; \forall i = 2, 3, \ldots, n$$

wherein $a_i$ is a concentration of the contamination species i transformed using the forward linear transformation, $C_i$ is a concentration of the contamination species i, $y_i$ is a production rate of the contamination species i, $k_i$ is a disappearance rate of the contamination species i, and $D(x, t)$ is the dispersion coefficient;

transforming, by the processor, governing equations of independent transport equations depending on the contamination species transformed using the forward linear transformation, using the following equation:

$$\frac{\partial a_i}{\partial t} + v(x,t)\frac{\partial a_i}{\partial x} - \frac{\partial}{\partial x}\left[D(x,t)\frac{\partial a_i}{\partial x}\right] = -k_i(x,t)a_i;$$

$$\forall i = 2, 3, \ldots, n$$

wherein $a_i$ is a concentration of the contamination species i transformed using the forward linear transformation, $k_i$ is a disappearance rate of the contamination species i, $v(x, t)$ is the groundwater flow velocity, and $D(x, t)$ is the dispersion coefficient;

transforming, by the processor, initial conditions and boundary conditions for multiple contamination species into initial conditions and boundary conditions adapted for the independent transport equations depending on the contamination species, based on the forward linear transformation, using the following equations:

$$a_{i0} = C_{i0} + \sum_{j=1}^{i-1} \prod_{l=j}^{i-1} \frac{y_{l+1}k_l}{k_l - k_i} C_{j0}; \forall i = 2, 3, \ldots, n$$

$$a_{ib}(t) = C_{ib}(t) + \sum_{j=1}^{i-1} \prod_{l=j}^{i-1} \frac{y_{l+1}k_l}{k_l - k_i} C_{jb}(t); \forall i = 2, 3, \ldots, n$$

wherein $C_{i0}$ and $C_{ib}(t)$ are initial and Dirichlet boundary conditions [ML$^{-3}$] of species i in a non-transformed zone, and $a_{i0}$ and $a_{ib}(t)$ are initial and boundary conditions [ML$^{-3}$] of the species i in a transformed zone;

determining, by the processor, analytical solutions depending on the contamination species transformed using the forward linear transformation under groundwater flow and dispersion coefficient varying with time and space, by means of GITT, using the following equation:

$$\frac{d^2 \varphi_n(x)}{dx^2} + \beta_n^2 \varphi_n(x) = 0, n = 1, 2, \ldots, \infty$$

wherein $\beta_n$ and $\varphi_n(x)$ are an $n^{th}$-eigenvalue and an eigenfunction corresponding thereto, and $v_0$ and $D_0$ are $v(x, t)$ and $D(x, t)$ at x=0 and t=0;

transforming, by the processor, the analytical solutions independently obtained depending on the contamination species into analytical solutions of first-order linearly coupled multispecies transport equations through backward linear transformation, using the following equation, thereby determining analytical solutions for multispecies contaminant transport:

$$C_i = a_i = \sum_{j=1}^{i-1} \prod_{l=j}^{i-1} \frac{y_{l+1}k_l}{k_l - k_i} C_j; \forall\, i = 2, 3, \ldots, n$$

wherein $a_i$ is a semianalytical solution of an independent single species transport equation obtained by GITT; and utilizing the determined analytical solutions for multispecies contaminant transport to decontaminate the nuclear waste sites contaminated with radioactive materials and decayed daughter nuclides, and the sites contaminated with chlorinated organic solvents.

2. The method of claim 1, wherein the transforming into the initial conditions and the boundary conditions is performed in such a manner that, in a case where flux-type boundary conditions are related, the boundary conditions are transformed into flux boundary conditions using the following equation:

$$J_{ai}(t) = J_{ci}(t) + \sum_{j=1}^{i-1} \prod_{l=j}^{i-1} \frac{y_{l+1}k_l}{k_l - k_i} J_{cj}(t); \forall\, i = 2, 3, \ldots, n$$

wherein $J_{ci}(t)$ is a value under flux boundary conditions of the species i in the non-transformed zone ($J_{ci}(t) = v(x=0, t) f_i(t)$).

3. The method of claim 1, wherein the determining the analytical solutions depending on the contamination species is performed in such a manner that a forward transform is conducted using the following equation:

$$T_n^i(t) = \frac{1}{N_n^{1/2}} \int_0^L \varphi_n(x) U_i(x, t)\, dx;$$

and an inverse transform corresponding to the forward transform is conducted using the following equation:

$$U_i(x, t) = \sum_{n=1}^M \frac{1}{N_n^{1/2}} \varphi_n(x) T_n^i(t)$$

wherein $\varphi_n(x)$ an $N_n$ are an $n^{th}$-eigenfunction and norm represented by the following equations:

$$\varphi_n(x) = \cos(\beta_n(L-x)),\ N_n = \frac{1}{2}\left(L + \frac{v_0 D_0}{\beta_n^2 D_0^2 + v_0^2}\right).$$

4. The method of claim 1, wherein the determining the analytical solutions depending on the contamination species is performed in such a manner that, in a case of solute transport in homogeneous porous media under normal flow, when a decay rate and a dispersion coefficient of any space variable function are in a steady state, the solutions are derived using the following equation by a linear system theory:

$$T^i(t) = \exp(-A^{-1}Bt)T^i(0) + \exp(-A^{-1}Bt) \times \int_0^t \exp(A^{-1}B\tau)A^{-1}G^i(\tau)\, d\tau$$

Wherein A and B are constant matrixes, and G is a vector; and in a case of transient flow and first-order decay reactions in homogeneous porous media in which a porous medium is homogeneous and the flow velocity, dispersion coefficient and decay rate are temporarily variable, the analytical solutions are determined using the following equation:

$$T^i(t) = \exp\left(-\int_0^t k_i(\sigma)\, d\sigma\right) \times \exp\left(-B_1 \int_0^t v(\sigma)\, d\sigma\right) T^i(0) +$$

$$\int_0^t \exp\left(-\int_\tau^t k_i(\sigma)\, d\sigma\right) \times \exp\left(-B_1 \int_\tau^t v(\sigma)\, d\sigma\right) G^i(\tau)\, d\tau$$

$$B_{1nn} = \alpha_L \beta_n^2 + \frac{1 - \cos^2(\beta_n L)}{2N_n}$$

$$B_{1nr} = \frac{\beta_r^2[1 - \cos(\beta_n L)\cos(\beta_r L)] - \beta_n \beta_r \sin(\beta_n L)\sin(\beta_r L)}{N_n^{1/2} N_r^{1/2}(\beta_r^2 - \beta_n^2)},$$

$n \neq r$.

5. A non-transitory recording medium, in which a program configured to execute the method of any one of claims 1 to 4 on a computer is recorded.

* * * * *